United States Patent [19]

Christie

[11] 4,408,480
[45] Oct. 11, 1983

[54] GAS LEAK DETECTOR VIEWER

[76] Inventor: Eugene J. Christie, P.O. Box 5372, Mission Hills, Calif. 91345

[21] Appl. No.: 305,485

[22] Filed: Sep. 25, 1981

[51] Int. Cl.³ .................. G01M 3/04; G01N 31/12
[52] U.S. Cl. ........................................ 73/40.7; 436/3
[58] Field of Search .............. 436/3, 171; 422/54, 422/80, 55, 89, 91, 86; 356/315; 73/40.7; 350/319; 116/202

[56] References Cited

U.S. PATENT DOCUMENTS

| 489,418 | 1/1893 | Pierce | 116/202 |
|---|---|---|---|
| 1,029,041 | 6/1912 | Beane | 116/202 |
| 1,736,621 | 11/1929 | Platt | 350/319 |
| 1,751,222 | 3/1930 | Styler et al. | 73/23 |
| 2,658,134 | 11/1953 | Miller | 73/23 |
| 2,665,618 | 1/1954 | Heideke | 350/319 |
| 3,107,517 | 10/1963 | Loyd et al. | 73/23 |
| 3,603,085 | 7/1952 | Cannon | 436/171 |
| 3,945,244 | 3/1976 | Wormser | 73/40.7 |
| 3,979,625 | 9/1976 | Roberts | 73/23 |
| 4,097,239 | 6/1978 | Patterson | 356/315 |

FOREIGN PATENT DOCUMENTS

| 214838 | 4/1958 | Australia | 73/40.7 |
|---|---|---|---|
| 779212 | 7/1957 | United Kingdom . | |

Primary Examiner—Charles E. Frankfort
Assistant Examiner—Denis E. Corr
Attorney, Agent, or Firm—William H. Maxwell

[57] ABSTRACT

A viewer for improving the visibility of Halide gas leak detectors, and comprising an observation tunnel embracing the flame shield of the detector at one closed end, open at the other end for closure by the face of the person making the observation directly by eye, and characterized by inlet and exhaust ventilators at opposite ends thereof and the later operating as a chimney for convection flow of heated flame gases, the ventilators being of labyrinth form obscuring outside light from the tunnel.

3 Claims, 3 Drawing Figures

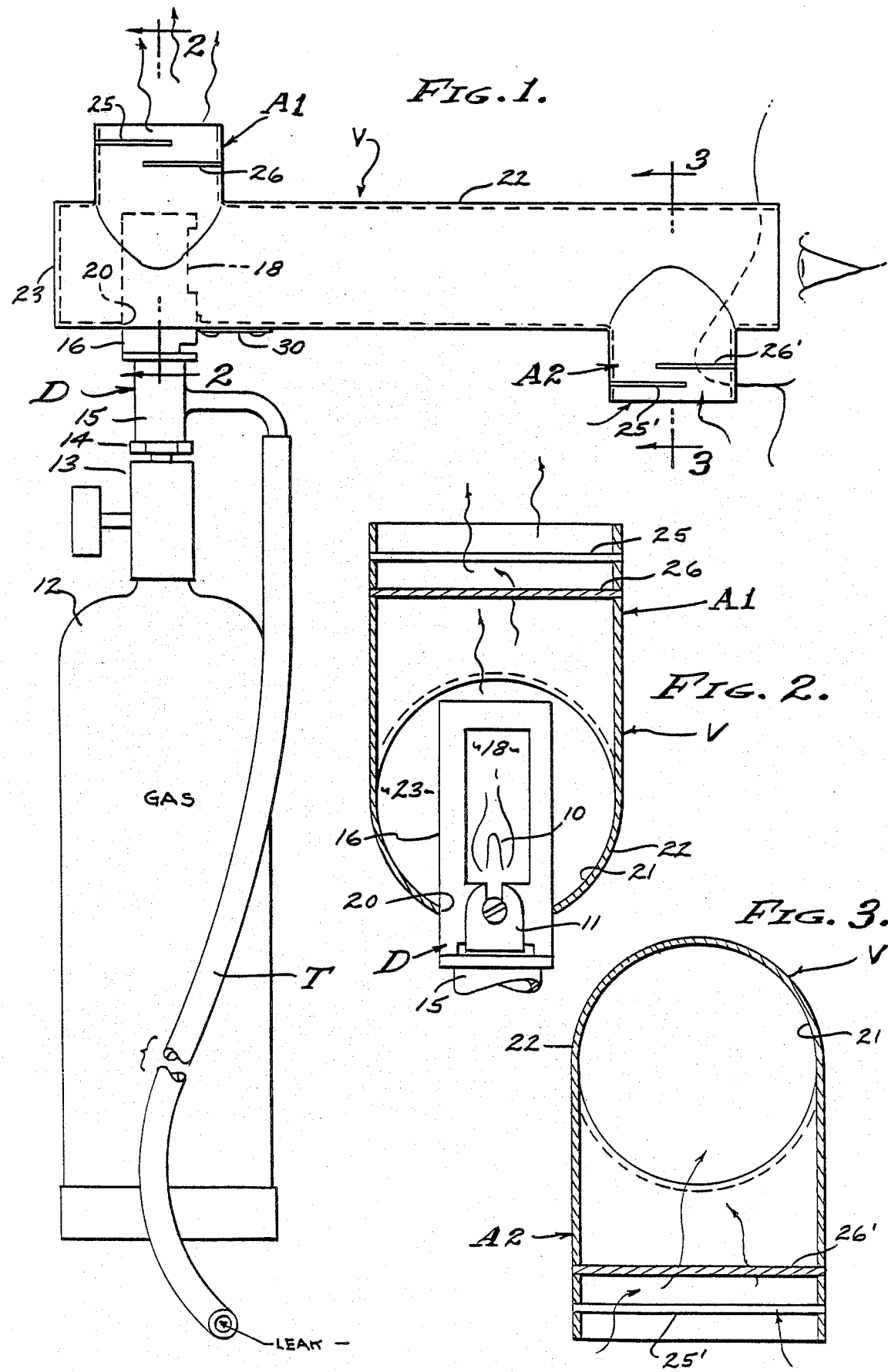

GAS LEAK DETECTOR VIEWER

BACKGROUND

The leakage of noncombustible gas from refrigeration systems and the like has been determinable with the use of Halide gas leak detectors wherein there is a flame which distinctly changes color in the presence of Freon, Carrene and Methyl Bromide vapors. The concentration of these leaking gas vapors is low, for example 10%, with respect to the surrounding atmosphere; and the flame is produced by a clean burning gas such as Propane in the presence of a Halide reactor plate at or surrounding the flame. Heretofore, the shield or burner holder has not afforded sufficient obliteration against surrounding light, and for example it is next to impossible to detect leaks thereby in direct sunlight. In practice, there is a search hose leading to the burner holder, the terminal end of said hose being open and held near the potential leak points to be tested. Such a leak is referred to as a Perchlorethylene leak, Chloride being employed in the reaction plate, and is detected by color change in the Propane flame above the reactor plate; pale blue indicating no leakage present, pale green indicating slight leakage vapors present, brilliant green indicating moderate leakage vapors present, and brilliant peacock blue indicating heavy leakage vapors present. In bright sunlight the slight and moderate leaks are not detectable at all and even the most brilliant color change is not readily detectable. Therefore, it is a general object of this invention to provide a viewer that obscures the detection flame from all direct light that would normally interfere with the observation required by the technician in his search for leaks.

Heretofore, the shield or burner holder has been an open ended cylinder with a side window through which the changeable flame is observed; and all of this can remain unchanged with the present invention which provides a viewer that embraces the flame in the presence of the reactor plate, and all of which is obscured from direct light, especially sunlight when the detection process is carried on out of doors. With the present invention, there is a viewing tube intended to be used in a substantially horizontal disposition with the detection flame enclosed therein at one closed end, to be viewed from the other open end. A feature and object herein is to ventilate the aforesaid tube, not only to permit the heated products of combustion to escape, but also to permit a draft to proceed through the tube while the said open end thereof is substantially closed by the close proximity of the persons face when observing the said flame. The viewer is characterized by the baffled ventilators, one for the inlet by convection flow to the outlet of the gases heated by combustion during the process of observing the color of the detection flame obscured from surrounding light.

It is an object of this invention to protect the eye of a person viewing the flame exposed within the closed chamber, by a distance separation conducive to natural close-up observation, and by a ventilation system which operates inherently by means of convection.

SUMMARY OF THE INVENTION

This invention relates to the inspection of systems wherein leakage of certain noncombustible gases is a problem, for example mechanical refrigeration systems and the like which contain Freon, Carrene and/or Methyl Bromide gases. For example, pressurized telephone cables. Heretofore, Halide gas leak detectors have been employed for this purpose, and it is such a detector that is employed herein, but with the improvement of a viewer therefor which permits daylight viewing without impairing the technician's ability to see discrete variations in color of the detection flame. Accordingly, a light obscuring tube is provided, with a detector holder at one end and the other end open for viewing, all without lenses and of a length conducive to comfortable focusing with the natural eye. Protection for the persons eye is afforded by distance and the convection flow of air inherent when heat is applied to exhaust the products of combustion through a ventilator or chimney at said one end. A complementary ventilator or inlet is at said other end; both of the ventilators being of labyrinth form to trap light while passing gases for ventilation of the tunnel-like structure.

DRAWINGS

The various objects and features of this invention will be fully understood from the following detailed description of the typical preferred form and application thereof, throughout which description reference is made to the accompanying drawings, in which:

FIG. 1 is an elevational view showing the viewer of the present invention applied to the gas leak detector and with the face of the user in operational position.

FIGS. 2 and 3 are enlarged detailed sectional views taken as indicated by lines 2—2 and 3—3 on FIG. 1.

PREFERRED EMBODIMENT

The viewer V of the present invention has its utility in obscuring light from a gas leak detector D that employes the Halide principle wherein a flame changes color when exposed to leaking noncombustible gases such as Freon, Carrene and Methyl Bromide vapors under 10% concentration. It is observation, by eye of the technician, of an adjusted flame 10 in the presence of a reaction element 11 that changes color from pale blue to green and brilliant peacock blue depending upon the degree of vapor concentration caused by leakage. It is a Perchlorethylene leak which is to be detected, and for this purpose the state of the art provides the gas leak detector D which is briefly described, as follows:

The gas leak detector D involves generally, a fuel supply 12, a valve assembly 13, an orifice block 14, a body 15, and a flame shield 16. The fuel supply 12 is a cylinder of pressurized Propane with an attachment fitting adapted to receive the valve assembly 13. The valve assembly 13 becomes rigid with the Propane cylinder and has a control handle or wheel for opening and closing the valve means thereof. The discharge of valve assembly 13 is through the orifice block 14 which determines the flow of the Propane for combustion. The controlled discharge of said Propane is into the body 15 where it is admixed with the gas leak vapors to be detected, and accordingly there is a search tube T opening into the body 15, said tube being flexible so as to extend to and/or explore for leaks of said refrigerant gas and the like. The search tube T is a conductor for said leaking vapors which disperse and travel readily into the body chamber to comingle with the Propane gas. The Propane gas and/or admixture thereof with the vapors to be detected is discharged into the flame shield and lighted, in the presence of the reactor plate 11 that encircles the base of the flame. Reactor plate 11 involves a compound of a Halogen which causes the flame to change color, as described. In practice, the flame is most effective when adjusted approximately 1/16 inch to ⅜ inch above the reactor plate. This gas detector D is ready to use when the reactor plate 11 is a dull red in color, the flame 10 being visible through a window 18.

Referring now to the viewer V of the present invention, the detector body 15 with its window 18 exposing the flame 10 is adapted to be received therein for observation while obscured from outside light sources, such as direct sunlight or any other lighting. In practice, the body 15 is vertically disposed for the natural convection process of the flame 10, in which case observation of said flame is most convenient along a horizontal axis. Accordingly, the viewer V involves generally, a horizontally disposed and tubular body B, a gas leak detector receiver opening 20 at one end of the body, an exhaust ventilator A1 in alignment over the detector receiver opening 20, and an inlet ventilator A2 into the other end of the body at the lower side thereof.

The open body B is a chambered element, preferably of tunnel-shape or tube form having inner and outer diameter walls 21 and 22 closed by an end wall 23 at the receiver opening end thereof. In practice, the detector body 15 is 1¼ inch in diameter, 2½ inches in height, and with a half height window 18 nearer the top thereof as shown, in which case a viewer body tube of 2 inches diameter is provided with a 1¼ inch diameter receiver opening 20 at its bottom side near the said closed end accommodating said detector body 15 with its window 18 disposed in a chamber for observation. The open end of the viewer tube B opposite the closed end is also closed in use by the close proximity of the user's face when observing the flame 10.

The exhaust and inlet light restricting ventilators A1 and A2 are alike, one being disposed over the body B to operate as a chimney, and the other being disposed beneath the body B to operate as an inductor. In carrying out this invention, the exhaust ventilator A1 is at the closed end of the tube body B and in alignment with the receiver opening 20, while the inlet ventilator A2 is at the open end of the tube body B, both on vertical axes normal to the horizontal axis of body B. The function of the ventilators is to induce and to freely pass the convection flow of gases caused to rise as a result of combustion heat, by circulation thereof away from the eye of the observer at the open end of the body tube. Labyrinth means L is employed for this dual purpose, comprised of overlying baffles 25-26, and 25'-26' respectively.

As shown, the light restricting ventilators A1 and A2 are right angular tubular extensions of the body B with the diameters thereof in open communication into said body. The said baffles extend transversely and in parallel overlapped relation across the ventilator tubes, so that direct outside light rays cannot enter into the viewing chamber of body B, all surfaces being non-reflective in the preferred form.

From the foregoing and an examination of FIG. 1 of the drawings, it will be seen that it is a simple matter to activate the gas leak detector D by lighting the flame 10 and adjusting it above the reactor plate 17 as described, and by inserting the body 15 through the receiver opening 20, to be held by a retainer 30, and so as to expose the window 18 toward the open end of the tube body B. The search tube T is then employed to explore for gas leaks in the usual manner, while observation of the flame 10 is through the darkened tube interior, as it is closed by close proximity to the technicians face. It is to be observed that the light restricting ventilator tubes A1 and A2 are vertically disposed so as to induce induction as well as exhaust by means of convection flow of heated gases discharged vertically from the flame 10 while fresh cool air is circulated by and away from the eye of the technician viewing said flame. Darkness within the tube body B enables discriminate viewing by the technician, and the convection circulation ensures comfort and safety despite the closeness of the flame to the eye without intervening obstruction.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. A viewer for enabling flame visability of Halide gas leak detector in the presence of sunlight, and including; an elongated tubular body closed at one end and open at the other end for closure by means of close proximity to the face of the person aligning an eye for observation through said tubular body toward said one closed end thereof, a receiver opening at a lower side of the tubular body at said one closed end thereof, the Halide gas leak detector having a shield holder for a burner body producing the said flame and inserted through the receiver opening and held positioned within said one closed end of the tubular body, a light restricting exhaust ventilator at the upper side of the tubular body and venting the flame of the gas leak detector positioned within the tubular body through said receiver opening, and a light restricting induction ventilator at the lower side of the tubular body at said open end thereof for convection inlet flow of air and thermal protection of the person's face and eye, whereby outside sunlight is obscurbed from the interior of the tubular body and the flame is discriminately viewed in darkness.

2. The gas leak detector as set forth in claim 1, wherein the tubular body is horizontally disposed and the ventilators vertically disposed normal to said tubular body for vertical disposition of said flame and natural convection flow of heated combustion gas therethrough.

3. The gas leak detector viewer as set forth in claim 1, wherein the light restricting ventilators each include a labyrinth for the free passage of the gases of combustion which obscuring outside light from the flame.

* * * * *